United States Patent Office 3,260,568
Patented July 12, 1966

3,260,568
RECOVERY OF HYDROGEN BROMIDE FROM DILUTE FLUIDS CONTAINING BROMIDES
Herman S. Bloch, Skokie, and George R. Donaldson, Barrington, Ill., assignors to Universal Oil Products Company, Des Plaines, Ill., a corporation of Delaware
No Drawing. Filed Dec. 31, 1962, Ser. No. 248,296
8 Claims. (Cl. 23—154)

This invention relates to a process for the removal of hydrogen bromide or organic bromides that decompose to yield hydrogen bromide from fluid streams containing low concentrations of bromide and the recovery of a hydrogen bromide concentrate from the process. More specifically, this invention concerns a method for adsorbing hydrogen bromide from a dilute fluid stream containing the same, utilizing an adsorbent which undergoes a reversible bromide-chloride exchange, providing a means for recovering hydrogen bromide in a usable, concentrated form while simultaneously reconstituting the adsorbent to an absorptive form for recycling to the adsorption stage of the process.

Bromine and hydrogen bromide are highly useful chemical reagents which provide organic bromides having a unique degree of activity, different from other halogens and hydrogen halides, being preferred for many products and processes which rely upon its unique properties and chemical reactivity; however, elemental bromine and, therefore, the bromides prepared therefrom are relatively costly chemicals because of the rarity and the cost of recovering bromine from its natural sources of supply, bromine being approximately 8 times as costly as chlorine on a mole for mole basis and about 4 times as costly on a weight for weight basis. The element is generally recovered from oceanic waters and from brine well deposits by means of a recovery process which comprises electrolyzing, chlorinating, or acidifying the brine to release elemental bromine or hydrogen bromide into the solution, followed by aerating the resulting dilute solution, absorbing the bromine or hydrogen bromide from the aeration effluent which is also highly diluted, and distilling the absorption liquor to recover the element or hydrogen bromide. In many instances the bromide is desired only transitorily to take advantage of its unique properties in a reaction involving a bromide and is then recovered from its transitory intermediate conversion product(s) for recycle in the process. In this manner a relatively small quantity of the bromide is used repeatedly in a process involving continuous recycle of the bromide. But in the bromine recovery stages of such processes dilute mixtures of organic bromides in air or inert gases are formed which have been consistently vented from the process because the cost of recovering the bromine from streams of such low concentration of bromides is excessive when using conventional recovery procedures. The method for recovering bromine by means of the process of this invention is especially adapted to handle dilute bromide-containing fluid streams of either gaseous or liquid form to yield a recovered hydrogen bromide in concentrated form as the principal product of the process. The treatment of bromidic feed stocks in accordance with the process of this invention, also referred to herein as an "adsorption" procedure, is dependent for its effectiveness on the special properties of a solid adsorbent, more specifically characterized hereinbelow, capable of undergoing reversible chloride-bromide exchange, depending upon equilibrium relationships between the adsorbent solid and the chloride and bromide-containing fluid streams contacted with the solid.

It is one object of this invention to provide an economically practical process for recovering hydrogen bromide in concentrated form from dilute bromide-containing fluid mixtures. Another object of this invention is to effect the aforesaid recovery of hydrogen bromide utilizing a solid adsorbent which operates effectively at nominal process conditions and which is also capable of having its adsorptive capacity restored at mild conditions utilizing readily attainable regeneration procedures.

In one of its embodiments this invention relates to a process for removing a bromide selected from the group consisting of an organic bromide and hydrogen bromide from a fluid mixture in which said bromide is present in low concentration which comprises contacting said mixture substantially in the absence of moisture with a solid adsorbent for hydrogen bromide containing a metal subchloride and consisting of the reaction product of a refractory metal oxide and a metal chloride, effecting said contact at adsorption conditions whereby hydrogen bromide replaces at least a portion of the chloride from said solid adsorbent, withdrawing raffinate fluid substantially free of bromide from the downstream end of the adsorbent, continuing the addition of said mixture to the solid adsorbent until the bromide content of the adsorbent does not substantially exceed about 6 percent by weight of bromine, forming thereby spent adsorbent, separately contacting the resulting spent adsorbent with a fluid substantially free of moisture and containing a chloride selected from the group consisting of hydrogen chloride and an organic chloride at a temperature and pressure sufficient to convert said organic chloride to hydrogen chloride and to displace hydrogen bromide from said spent adsorbent, thereby regenerating said metal sub-chloride adsorbent, and recovering a desorbate stream comprising concentrated hydrogen bromide displaced from said adsorbent.

The present separation-recovery process is herein characterized essentially as an adsorption process involving the retention on a solid adsorbent of the hydrogen bromide component in a fluid feed stock, present initially in the feed stock as hydrogen bromide or formed by in situ decomposition of an organic bromide in either a stage preceding the present adsorption stage of the process or in the presence of the adsorbent via in situ decomposition. In accordance with the present hydrogen bromide recovery process the bromide-containing feed stock is contacted with a fixed bed of solid particles composed of a metal oxide-metal sub-chloride complex which retains hydrogen bromide on mere contact of the feed stock with the solid adsorbent. The mechanism of the retention of hydrogen bromide involves more than surface adsorption phenomena, since stoichiometric exchange of bromide for a portion of the chloride ions present in the sub-chloride component of the adsorbent, accompanied by the disappearance of the hydrogen bromide from the feed stream and the simultaneous transfer of the released hydrogen chloride to the raffinate effluent stream indicates an intrinsic reaction mechanism which is more deep-seated than a surface adsorption effect between the solid and fluid phases existing in the process. The fact that the sub-chloride adsorbent in effect becomes "saturated" with hydrogen bromide as the adsorbent gradually acquires a "spent" condition during the adsorption and the fact, further, that the adsorbed hydrogen bromide is again released from the spent adsorbent by contact of the latter with hydrogen chloride vapors during reactivation of the adsorbent establishes the operative mechanism of the adsorption as a reversible reaction—a shift in the equilibrium toward the formation of the sub-bromochloride and sub-bromide when a molar excess of hydrogen bromide vapors is present in the feed stream and a reverse shift of the equilibrium toward the displacement of hydrogen bromide from the sub-bromide chloride and sub-bromide and the regeneration of the sub-chloride when a molar excess of hydrogen chloride vapors is present in the vapor phase contacted with the spent adsorbent. The reversibility of the reaction involved may be illustrated by the following empirical equation:

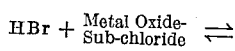

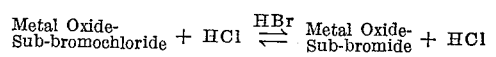

The foregoing reversible exchange occurs isothermally as well as at dissimilar temperatures, depending upon which direction the equilibrium is to be shifted, except that under isothermal conditions the direction of the equilibrium shift depends upon the relative proportions of hydrogen chloride and hydrogen bromide in the reaction zone.

In the adsorption stage of the process, the feed stock containing the dilute hydrogen bromide (formed in an upstream decomposition reactor or in situ from an organic bromide, or as hydrogen bromide itself) is contacted with the adsorbent at a temperature of from about 70° to about 300° C., preferably at temperatures of from about 100° to about 250° C., the temperature demands of the process depending upon whether the bromide is present as hydrogen bromide (permitting adsorption at relatively low temperatures) or as an organic bromide (requiring relatively higher simultaneous decomposition temperatures). The pressure variable is largely determined by the physical state of the fluid feed stock (i.e., whether in liquid or gaseous form), the maintenance of liquid conditions requiring higher pressures for certain feed stocks than the maintenance of vapor phase conditions in the adsorption stage. Generally, however, pressures of from atmospheric to 50 to 60 atmospheres provide a range useful for most feed stocks.

The composition and physical structure of the material referred to herein as the solid adsorbent are variable factors which are of critical importance to the successful and effective operation of the process. Although the exact nature of the chemical structure and chemical bonding involved in the present adsorbent has not been fully characterized, it is essentially an inorganic complex or compound of a refractory metal oxide in which the metal is a polyvalent element and a Friedel-Crafts metal chloride which exists in the adsorbent complex as a sub-chloride; that is, the valence bonds of the Friedel-Crafts metal are shared by both oxygen and chlorine. While the adsorbents are prepared from Friedel-Crafts metal chlorides, the essentially active complex resulting from the preparation does not contain the metal chloride in its free form, as have compositions of the same general type known in the prior art.

The compositions herein referred to as adsorbents and containing sub-halides are frequently used as catalyst supports for catalytic metals and metal compounds and provide, further, at least a portion of the catalytically active ingredient for the reaction involved in the process. Thus, in the preparation of hydrocarbon isomerization catalysts containing an aluminum sub-halide as a support for a metal or metal halide of a Group VIII metal, such as platinum or palladium, the aluminum sub-halide provides a catalytically active ingredient in the subsequent isomerization reaction for which the catalyst was intended and the exchange between bromine and chlorine in accordance with the present invention provides a means of controlling the composition of the catalyst and thereby its activity. An increase in the chloride content of the catalyst base (the aluminum sub-halide) increases the acidity of the base and its isomerizing activity, whereas a replacement of part of the chloride with bromine decreases the acidity of the base and reduces the activity of the catalyst. In actual practice, hydrogen chloride or an alkyl chloride is added to the feed stock contacted with the catalyst at conversion conditions if an increase in conversion is desired. The addition of hydrogen bromide or an alkyl bromide to the feed stock, on the other hand, tends to reduce the rate of conversion as a result of the consequent reduction in acidity of the catalyst base. Such control over the outcome of the process is also applicable to other processes catalyzed by a halogen-containing aluminum sub-halide composition, as in alkylation, hydroreforming, polymerization, etc.

In the first step of the adsorbent preparation, a Friedel-Crafts metal chloride of the type hereinafter specified is vaporized onto the refractory oxide until the increase in the weight of the oxide is within the range of from about 2 percent to about 50 percent. The amount of Friedel-Crafts metal chloride initially composited with the metal oxide by sublimation thereon is preferably at least double the desired amount eventually present in the final composite, although in a continuous process for compositing the metal chloride with the metal oxide by means of a continuous vaporization procedure, the amount of metal chloride may be reduced to an amount just slightly greater than the desired net weight increase of the final composite. It is obvious that this amount, in any case, is not critical and that the maximum amount may be varied over a rather wide range, since any excess metal chloride, above that required to form the sub-chloride present in the final composite by reaction between the metal chloride and the refractory metal oxide will be removed in the subsequent calcination step in which the excess metal chloride is volatilized therefrom during the preparation of the adsorbent.

Various Friedel-Crafts metal chlorides may be used, but not necessarily with equivalent results. Examples of such chlorides include aluminum chloride, antimony penta-chloride, beryllium chloride, ferric chloride, gallium trichloride, stannic chloride, titanium tetrachloride, zinc chloride and zirconium chloride. Of these Friedel-Crafts metal chlorides aluminum chloride is particularly preferred because of the ease of preparing adsorbents of exceptionally high activity from an aluminum sub-chloride, particularly when the metal oxide component of the sub-chloride complex is aluminum oxide. The group of refractory oxides suitable for use in the preparation of the sub-chloride includes such substances as silica (a non-metallic, refractory oxide), alumina, titanium dioxide, zirconium dioxide, chromium oxide, zinc oxide, and combinations of refractory oxides such as chromium-alumina, silica-alumina, silica-zirconia, alumina-boria, bauxite, kaolin, kieselguhr, etc. Of these refractory metal oxides, alumina is especially preferred and particularly, synthetically prepared gamma alumina of high surface area and of high purity.

The temperature at which the Friedel-Crafts metal chloride is vaporized onto the refractory oxide will vary in accordance with the particular metal chloride utilized, and sublimation in vacuo may be utilized, if necessary, to reduce the temperature required to effect the transfer of the metal chloride onto the metal oxide. Although, theoretically, any feasible sublimation temperature may be utilized in the preparation of the present adsorbent, since the metal oxide support is a refractory material, useful temperatures are generally restricted to limits set by the crystalline or amorphous structure of the oxide. Thus, gamma alumina is a particularly effective metal oxide when composited with an aluminum sub-chloride; however, at temperatures above about 1100° C., gamma alumina is converted to the less preferred, more dense, lower surface area form of alumina comprising alpha-alumina. Hence, the temperature limits for the adsorbent preparative process at any stage of adsorbent preparation is set not only by the sublimation temperature required to transfer the metal chloride onto the metal oxide base, but also by the temperature required to re-sublime excess free metal chloride out of the adsorbent complex, the limit set by the activities of the various physical structures of the metal oxide component, etc.

The preferred metal oxides are prepared in an especially purified form from a salt of the metal by conversion of the salt to an hydroxide or oxide, for example, by the addition to an aqueous solution of the metal salt of a suitable reagent which precipitates the hydroxide or oxide form of the metal directly, including such reagents as the alkali metal hydroxides, carbonates and bicarbonates (e.g., lithium, sodium and potassium hydroxide, lithium, sodium and potassium carbonate, etc.), ammonium hydroxide, ammonium carbonate, etc. Thus, an aqueous aluminum chloride solution when mixed with ammonium hydroxide forms a precipitate of hydrated aluminum hydroxide which upon filtering and drying readily dehydrates to the oxide. When the oxide is calcined at temperatures of from about 300° to about 500° C. an especially active form of alumina designated as gamma alumina is formed. Eta alumina, another active form derived from an alumina hydrate, is also excellent as a refractory oxide support. Aluminum oxide and other metal oxides are also formed by the controlled oxidation of the metal itself, for example by burning the metal in air at a rate which limits the temperature to the desired active oxide. Other methods of preparation include reaction of the metallic element with water, accompanied by the liberation of hydrogen. The preferred refractory oxides are selected for their high surface areas which appear to have a beneficial effect on the adsorptivity of the sub-chloride composite. In many instances high surface areas are developed during the preparation of the refractory oxide from its starting material under carefully controlled conditions of heating to the specific temperatures and for specific periods of time. Therefore, during the calcination step of the preparation, care must be taken that the high surface area of the refractory oxide does not decline during the heat treatment utilized. Accordingly the maximum temperature of such heat treatment or calcination is about 700° C.

In the second stage of preparing the present sub-chloride adsorbent, the metal oxide is complexed with the metal chloride by sublimation of the metal chloride onto the surface of the refractory oxide. Thus, for the preparation of one of the preferred sub-chlorides herein, consisting of an aluminum oxide-aluminum chloride composite, aluminum chloride is sublimed onto aluminum oxide previously prepared, at a vaporization temperature of from about 180° to about 275° C. As the aluminum chloride is deposited on the aluminum oxide, the sub-chloride forms, resulting in the evolution of hydrogen chloride. To ensure freedom of the resultant composite from free aluminum chloride which nominally sublimes at 178° C., the sub-chloride composite is calcined at a temperature above said sublimation temperature (not exceeding, however, about 700° C.), and more preferably, above about 300° C. for a sufficient time to remove therefrom any unreacted aluminum chloride, the calcination preferably being conducted in a stream of dry, inert gas such as air, nitrogen, hydrogen or hydrogen chloride. The first portion of aluminium chloride vaporized on to the alumina base is believed to form a sub-chloride or an oxy-dichloride which becomes admixed with free aluminum chloride upon further vaporization of aluminum chloride onto the complex. The subsequent calcination results in a loss of excess aluminum chloride (i.e., that which has not reacted chemically), leaving the sub-chloride in which the aluminum atoms share their valence bonds with both oxygen and chlorine. Whether this is the actual mechanism involved in the formation of the present sub-chloride complex, however, the final adsorbent after calcination above about 300° C. is free of vaporizable aluminum chloride. The exact temperature to be utilized in the calcination will depend upon the boiling point or sublimation temperature of the particular Friedel-Crafts metal chloride utilized. In general, particularly with aluminum chloride, temperatures of from about 400° C. to about 600° C. and calcination periods of from 1 to about 48 hours are satisfactory.

In the preparation of the adsorbents outlined in the process of the present invention, the refractory metal oxide after vaporization thereon of the Friedel-Crafts metal chloride and after heating of the thus formed composite will be increased in weight from about 2 to about 25 percent, based on the original weight of the refractory metal oxide. While the exact increase in weight of the metal oxide after sublimation of the metal chloride thereon does not appear to be critical in the preparation of the adsorbent, except that the upper limit of the amount of metal chloride is critical to the production of a composite containing no free metal chloride, active adsorbents are obtained when the increase in the weight of the refractory oxide as a result of the treatment with the metal chloride is from about 3 to about 20 percent. During the preparation and subsequent heating of the composite, the Friedel-Crafts metal chloride appears to react with the refractory metal oxide to form the metal oxide-sub-chloride complex comprising the present adsorbent.

Where the physical form of the present adsorbent is not critical, it is generally preferred to utilize macro particles to enable the final sub-chloride to be utilized as a fixed bed in the adsorption zone without undue pressure drop of the fluid stream through the reactor. Thus, it is desirable to form either the initially prepared refractory oxide or the sub-chloride composite (preferably the former, because of the necessity for handling the latter under anhydrous conditions) into particles within a size range of from about 50 mesh to about 2 mesh per inch which may be accomplished by grinding the particles to a powder, followed by pilling the resultant powder to the desired particle size or by sifting the ground powder through a screen of the desired particle size by known methods. Alternatively, the initially prepared metal oxide may be formed into macro particles of spherical shape, for example, by dropping the refractory oxide as an aqueous sol into a gelling fluid which suspends the sol droplets as the conversion from metal oxide sol to spherically shaped gel particles proceeds, in accordance with techniques developed by the prior art. Thereafter, the metal chloride is deposited onto the dried and calcined refractory oxide spheres via sublimation, followed by calcination at the aforementioned temperatures to form the sub-chloride adsorbent.

In order to maintain the adsorbent at a sustained high activity (that is, for prolonged processing periods and for repeated adsorption-regeneration cycles), the water content of the fluid feed stock contacted with the adsorbent must be reduced to a low level, preferably to less than about 10 p.p.m. The sub-halide composition and porous structure of the adsorbent is thereby maintained at substantially its initial, reactive level for long periods of time, without accompanying rapid hydrolytic deactivation of the sub-chloride composition which would otherwise accompany the use of feed stocks containing more moisture. Accordingly, if the moisture content of the feed stock exceeds about 10 p.p.m., it is preferably dehydrated prior to contact with the solid sorbent herein by pretreatment with a desiccant which adds nothing to the feed stream harmful to the sub-chloride component. Typical desiccants useful for this purpose include certain anhydrous hydroscopic, inorganic salts such as calcium chloride, magnesium chloride, sodium sulfate, activated alumina, molecular sieves of the aluminosilicate type, and others, all characterized as being substantially inert to the feed stock and generally free from soluble alkaline components. As the desiccant is used, it is occasionally reactivated by dehydration, for example by calcination at a temperature sufficient to remove the water of hydration from the particles of desiccant.

The adsorption stage of the present process is operated in any suitable manner which effects intimate contact between the adsorbent in the form of the aforementioned solid marco particles and the fluid feed stock at the required conversion conditions set forth hereinabove. A convenient method of providing a substantially continuous process for contacting the fluid with the solid adsorbent while simultaneously regenerating the adsorbent for the next adsorption-regeneration cycle comprises maintaining two relatively elongated, fixed beds, such as a pair of vertically disposed towers packed with the adsorbent particles, in one of which adsorption of hydrogen bromide on activated adsorbent takes place while into the other bed hydrogen chloride is charged, displacing hydrogen bromide from the adsorbent as the latter undergoes regeneration and reactivation to the sub-chloride. The two beds are thereafter alternately switched as one approaches saturation with hydrogen bromide and the other becomes substantially free of hydrogen bromide by displacement with hydrogen chloride, respectively. The total cycle time for each bed and the rate of conversion are dependent upon the composition of the adsorbent, the temperature maintained during each stage of the cycle, the weight of adsorbent per unit volume of fluid feed stock undergoing treatment, and other mutually dependent factors. Each bed (that is, the adsorption and desorption beds) may be conveniently maintained at substantially the same temperature to provide essentially isothermal treatment, or, depending upon the respective reaction rates of the adsorption and desorption stages, the temperature in one reactor may be maintained at a higher level than the temperature in the other reactor.

Another method of effecting contact between the solid adsorbent, the feed stock and the desorbent streams under continuous countercurrent flow conditions is illustrated and described in U.S. Patent 2,985,589 issued to Donald B. Broughton et al. A continuous method of treatment is described therein for maintaining the solid adsorbent in a number of serially interconnected fixed beds, with fluid feed inlets alternating with fluid product outlets and effecting countercurrent contact between the fixed beds of solid particles and the flowing feed and desorbent streams by shifting the fluid inlets and outlets to next adjacent downstream points of inlet and outlet in a continuous, cyclic pattern.

The recovery of the hydrogen bromide product from the "spent" solid adsorbent in concentrated form (the stage of the cycle referred to herein as a displacement reaction or the desorption of hydrogen bromide from the solid adsorbent particles) is effected by a fluid desorbent containing chloride in the form of anhydrous hydrogen chloride present as such in the desorbent stream or formed either in situ or in an upstream organic chloride decomposition reaction, preferably the reaction of hydrogen with an alkyl chloride. The desorbent stream is supplied at a sufficient temperature, rate, and at a concentration of hydrogen chloride in the desorbent stream to shift the equilibrium toward the release of hydrogen bromide from the adsorbent and reconstitute the sub-chloride to its activated, hydrogen bromide adsorbing state. The chloride desorbent is supplied to the desorption stage of the cycle at a concentration of hydrogen chloride in the desorbent fluid of at least 5 percent by weight and more preferably, at a concentration of from about 10 to about 75 percent of the desorbent fluid. Although the preferred form of the chloride desorbent is hydrogen chloride because it is the most active chloride at all concentrations, organic chlorides capable of yielding hydrogen chloride upon contact with the spent adsorbent at decomposition conditions also provide a convenient source of potential hydrogen chloride, which may be formed in situ upon contact with the present adsorbent or in an external decomposition zone upstream relative to the desorption zone. Particularly preferred organic chlorides which yield hydrogen chloride upon thermal decomposition or by reaction with hydrogen are the lower alkyl chlorides and dichlorides as a class, such as one or a mixture of several species, including, for example, methyl chloride, ethyl chloride, ethylene dichloride, various propyl chlorides, butyl chlorides, amyl chlorides, etc. which yield hydrogen chloride and displace hydrogen bromide from the spent adsorbent at the temperatures specified hereinabove for operation of the desorption zone (that is, at temperatures of from about 75 to about 300° C.).

Hydrogen bromide is recovered from the effluent stream of the desorption zone in a form substantially free of hydrogen chloride by fractional distillation. Hydrogen bromide containing only small amounts of hydrogen chloride may be recovered by cooling the effluent to a temperature of from about $-30°$ to $10°$ C. at sufficient pressure to condense hydrogen bromide and any hydrocarbon residues remaining in the effluent stream of the decomposition of the organic chloride and/or organic bromide, if any, present in the desorption reactor effluent. The organic residues, such as hydrocarbons comprising the condensate are readily removed therefrom by contact with an inert adsorbent for the hydrocarbons such as charcoal, activated carbon, etc.

Since the adsorbents used herein are alternately in a sub-chloride and sub-bromide form, they may be prepared originally in the bromide form by reaction of the oxides with Friedel-Crafts metal bromides, subsequent calcination to remove excess Friedel-Crafts bromide, and finally, by reaction with hydrogen chloride, conversion to the sub-chloride form.

The present invention is further illustrated with respect to several of its specific embodiments in the following example which is introduced for illustrative purposes only without attempting to limit the generally broad scope of the invention necessarily in accordance therewith.

*Example*

In the following process hydrogen bromide was recovered from a nitrogen stream containing 80 p.p.m. of methyl bromide on a molar basis. The feed stock as a gas was fed at a rate of 2.3 moles per hour into a fixed bed of an adsorbent consisting of an aluminum chloride-treated gamma alumina.[1] The feed stream was charged into the adsorption reactor at 500 lbs./sq. in. gage pressure and at 200° C., the adsorbent bed being maintained at this temperature by an external heater surrounding the mass of adsorbent.

During the first 140 hours on stream an average of about 16 mg. per hour of bromide as methyl bromide were fed into the adsorption column and by analysis of the effluent product stream, less than 0.05 mg. per hour of bromide issued from the effluent end of the reactor. During the next 140 hours the feed stock was fed at a rate equivalent to 4.0 mg. of bromide per hour, during

---

[1] The adsorbent was prepared by precipitating aluminum hydroxide gel from an aqueous solution of aluminum chloride, using ammonium hydroxide as the alkaline base to precipitate the hydrated alumina from solution. The precipitated hydrated oxide was filtered, washed with distilled water, dried at 120° C. for 10 hours and calcined at 500° C. for 6 hours. The recovered alumina is the gamma form of the oxide. The recovered oxide was placed in an autoclave flushed with nitrogen containing 0.3 mole AlCl₃ (anhydrous) per mole of alumina and heated to 500° C. as the autoclave was rotated. After 3 hours, the contents of the autoclave were removed and heated for 6 hours at 400° C. from a vented reaction flask. During the first one-half hour 95 percent of the free aluminum chloride ultimately recovered sublimed out of the flask and during the succeeding 5.5 hours a slight additional quantity was sublimed. The final composite contained 4.03 percent by weight of combined chloride which was not sublimable from the complex. This was pilled under anhydrous conditions into cylinders of 1/16-inch diameter and length to provide the particulate adsorbent used in the experiment.

the first 80 hours of which less than 0.05 mg. per hour of bromine was recovered in the effluent product and during the next 60 hours of which an average of less than 0.4 mg. per hour was recovered. The rate of feed stock charged into the adsorption tower was then increased to 15 mg. per hour and the product was analyzed in successive 5-hour periods. The following Table I indicates the quantity of bromine present in the effluent product during this portion of the operation:

TABLE I.—HBr ADSORPTION FROM FEED STOCK CONTAINING 15 MG./HR. BROMINE ON SUB-CHLORIDE ADSORBENT

| Time elapsed, hrs.: | Bromine content of effluent, mg. Br |
|---|---|
| 5 | 0.6 |
| 10 | 2.6 |
| 15 | 4.4 |
| 20 | 2.6 |
| 25 | 2.6 |
| 30 | 2.6 |
| 35 | 6.3 |
| 40 | 10.5 |
| 45 | 10.5 |
| 50 | 9.8 |
| 55 | 9.8 |
| 75 | 12.4 |
| 90 | 10 |

Examination of the bed of adsorbent indicated that it was substantially saturated with respect to hydrogen bromide, the adsorbent containing 5.44 weight percent bromine as combined bromides. A running analysis of the effluent stream from the adsorption bed indicated that the amount of chloride displaced from the adsorbent bed was equivalent to the bromide adsorbed as hydrogen bromide.

In another experiment utilizing 10.3 gms. of an adsorbent prepared by vaporizing aluminum chloride onto gamma alumina (prepared as indicated in footnote 1, above) and calcining the resulting subchloride adsorbent at a temperature of 400° C. for 10 hours, and containing 0.43 gram chlorine as sub-chloride, a hydrocarbon stream (methane) containing 80 p.p.m. bromide as methyl bromide was contacted with the adsorbent bed at the same conditions utilized in the foregoing run. During the first 10 hours the bromide was fed into the adsorbent at a rate of 22 mg. per hour and during the next 40 hours at the rate of 15 mg. per hour of bromine. The effluent products of the adsorption were collected and analyzed yielding the following results: after 10 hours a total of 1.0 mg./hr. bromine appeared in the reaction effluent; after 20 hours a total of 2.5 mg./hr. total bromine appeared in the effluent and during the last 10 hours a total of 6.5 mg./hr. of bromine was present in the effluent products. A separate analysis of the effluent chloride indicated that 276 mg. of chlorine appeared in the effluent, equivalent to an average rate of 7.2 mg./hr.

The adsorbent was regenerated by charging into the reactor a stream of nitrogen containing 15 mg./hr. of isopropyl chloride (equivalent to 7 mg./hr. of chloride) for a period of 105 hours. The effluent products were collected and analyzed for bromine content. During the first 10 hours, bromine was recovered at the rate of 7 mg./hr.; during the next 10 hours bromine was recovered at the rate of 9 mg./hr.; during the next 20 hours the rate of bromine recovery was 11.5 mg./hr. and during successive 20-hour periods, the rate dropped to 9, 2.5 and 1 mg./hr. The total bromine recovered (that is, displaced by chloride desorbent) was 637 mg., equivalent to an average rate of 8.0 mg./hr. during the eighty hours of most active displacement. At the end of 165 hours of the above regeneration the adsorbent contained 3.94 percent chlorine and was again conditioned for receiving hydrogen bromide via adsorption.

We claim as our invention:

1. A process for removing a bromide selected from the group consisting of an organic bromide and hydrogen bromide from a fluid mixture in which said bromide is present in low concentration which comprises contacting said mixture substantially in the absence of moisture with a solid adsorbent for hydrogen bromide consisting essentially of a complex of a refractory polyvalent metal oxide and a Friedel-Crafts metal chloride, the valence bonds of the metal of said chloride being shared by both oxygen and chlorine, at adsorption conditions including a temperature of from about 70° C. to about 300° C. whereby bromide replaces chloride from said solid adsorbent, withdrawing raffinate fluid substantially free of bromide from the downstream end of the adsorbent, continuing the addition of said mixture to the solid adsorbent up to a bromide content of the adsorbent not substantially in excess of about 6 percent by weight of bromine to thereby form a spent adsorbent, separately contacting the resulting spent adsorbent with a fluid substantially free of moisture and containing a chloride selected from the group consisting of hydrogen chloride and an organic chloride at a temperature and pressure sufficient to convert said organic chloride to hydrogen chloride, and to displace hydrogen bromide from said spent adsorbent, thereby regenerating said adsorbent, and recovering a desorbate stream comprising concentrated hydrogen bromide displaced from said adsorbent.

2. The process of claim 1 further characterized in that said refractory metal oxide is alumina and said metal chloride is aluminum chloride.

3. The process of claim 2 further characterized in that said alumina is gamma alumina.

4. The process of claim 2 further characterized in that said complex is formed by subliming aluminum chloride onto alumina, and thereafter heating the resulting mixture to a temperature of from about 300° to about 600° C. whereby free, sublimable chloride is removed from said adsorbent.

5. The process of claim 1 further characterized in that said bromide is an organic bromide.

6. The process of claim 1 further characterized in that the stage of the process in which said chloride is contacted with said solid adsorbent containing bromide is effected at substantially the same temperature as the first stage of the process in which said bromide is contacted with said solid adsorbent.

7. The process of claim 1 further characterized in that said complex is formed by reacting an excess of aluminum chloride with aluminum oxide in a reaction mixture containing up to 50 mole percent of aluminum chloride and thereafter calcining the resulting reaction mixture at a temperature of from about 300° to about 600° C. at conditions which effect sublimation of excess aluminum chloride from the mixture.

8. The process of claim 1 further characterized in that said bromide is contacted with said solid adsorbent at a temperature and pressure sufficient to maintain said bromide in substantially gaseous phase.

References Cited by the Examiner

UNITED STATES PATENTS 2,929,682   3/1960   Clark _____ 23—154 XR

OSCAR R. VERTIZ, *Primary Examiner.*

EDWARD STERN, *Examiner.*